United States Patent
Lai et al.

(10) Patent No.: US 7,500,147 B2
(45) Date of Patent: Mar. 3, 2009

(54) TEST SYSTEM AND METHOD

(75) Inventors: Jason Lai, Shindian (TW); Yen Liang Chen, Shindian (TW)

(73) Assignee: Via Technologies, Inc., Shindian, Taipei (TW)

( * ) Notice: Subject to any disclaimer, the term of this patent is extended or adjusted under 35 U.S.C. 154(b) by 539 days.

(21) Appl. No.: 11/262,848

(22) Filed: Nov. 1, 2005

(65) Prior Publication Data
US 2006/0294428 A1 Dec. 28, 2006

(30) Foreign Application Priority Data
Jun. 22, 2005 (TW) ................. 94120855 A

(51) Int. Cl.
*G06F 11/00* (2006.01)
(52) U.S. Cl. ............. 714/30; 714/724; 714/726; 714/727
(58) Field of Classification Search ............ 714/30, 714/724, 733, 726, 727
See application file for complete search history.

(56) References Cited

U.S. PATENT DOCUMENTS

| 5,748,644 | A  | * | 5/1998  | Szabo ................... 714/733 |
| 5,963,566 | A  | * | 10/1999 | Rajsuman et al. ......... 714/733 |
| 6,003,142 | A  | * | 12/1999 | Mori ..................... 714/30  |
| 6,249,893 | B1 | * | 6/2001  | Rajsuman et al. ......... 714/741 |
| 6,687,857 | B1 | * | 2/2004  | Iwata et al. ............. 714/38  |
| 7,096,385 | B1 | * | 8/2006  | Fant et al. .............. 714/30  |
| 2002/0133773 | A1 | * | 9/2002 | Richter et al. ........... 714/733 |
| 2005/0210348 | A1 | * | 9/2005 | Totsuka .................. 714/724 |

* cited by examiner

*Primary Examiner*—Marc Duncan
(74) *Attorney, Agent, or Firm*—Birch, Stewart, Kolasch & Birch, LLP

(57) ABSTRACT

A test system includes a terminal host and a to-be-tested circuit board. The terminal host generates a trigger signal. The to-be-tested circuit board includes a system chip, a memory and a processor. The system chip receives the trigger signal from the terminal host and generates an interrupt. The memory stores a test program code corresponding to the interrupt. The processor receives the interrupt and executes the test program code corresponding to the interrupt stored in the memory to generate a test result. The system chip transmits the test result to the terminal host.

18 Claims, 3 Drawing Sheets

TEST SYSTEM AND METHOD

BACKGROUND OF THE INVENTION

1. Field of Invention

The invention relates to a test system and a test method and, in particular, to a test system and a test method for a circuit board.

2. Related Art

In general, a hardware device is composed of several components. If the hardware device wants to execute normally, the components have to be coordinated using a suitable interface such as a driver.

As shown in FIG. 1, a computer host 1 installs test software 11 for testing whether the system chip of the circuit board 12 and other devices can coordinate with each other normally. The system developer usually monitors the setting values of the circuit board 12 on-site with the test software 11. The setting values are, for example, the HD (hard disk) settings, the processors, the registers, and the IDT (Interrupt Descriptor Table) of the circuit board 12

However, if the computer host 1 can not successfully load the OS (operation system), the test software 11 will not be executed normally. In other words, the errors of the circuit board 12 occurred before the OS is loaded can not be figured out. Thus, the system developer can not debug the errors of the circuit board 12 or the related devices efficiently.

It is therefore an important subject of the invention to provide a test system and a test method, which can test the circuit board before the OS is loaded. Accordingly, the system developer can obtain the required test result of the circuit board, and can thus rapidly debug the errors of the circuit board or the related devices. As a result, the developing efficient of the circuit board is enhanced.

SUMMARY OF THE INVENTION

In view of the foregoing, the invention is to provide a test system and a test method that can test the circuit board before the OS is loaded.

To achieve the above, a test system of the invention includes a terminal host and a to-be-tested circuit board. In the invention, the terminal host generates a trigger signal. The to-be-tested circuit board includes a system chip, a memory and a processor. The system chip receives the trigger signal from the terminal host and generates an interrupt. The memory stores a test program code corresponding to the interrupt. The processor receives the interrupt and executes the test program code corresponding to the interrupt stored in the memory to generate a test result. The system chip then transmits the test result to the terminal host.

In addition, the invention also discloses a test method including the following steps of: generating a trigger signal by a terminal host, receiving the trigger signal from the terminal host by a to-be-tested circuit board, generating an interrupt according to the trigger signal, generating a test result according to a test program code corresponding to the interrupt, and transmitting the test result from the to-be-tested circuit board to the terminal host.

As mentioned above, the system chip of the to-be-tested circuit board receives the trigger signal from the terminal host and generates the interrupt for the processor. Thus, before the OS is loaded, the processor can execute the test program code corresponding to the interrupt stored in the memory to generate a test result. Accordingly, the system developer can obtain the required test result of the circuit board, and can thus rapidly debug the errors of the circuit board or the related devices. As a result, the developing efficient of the circuit board is enhanced.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
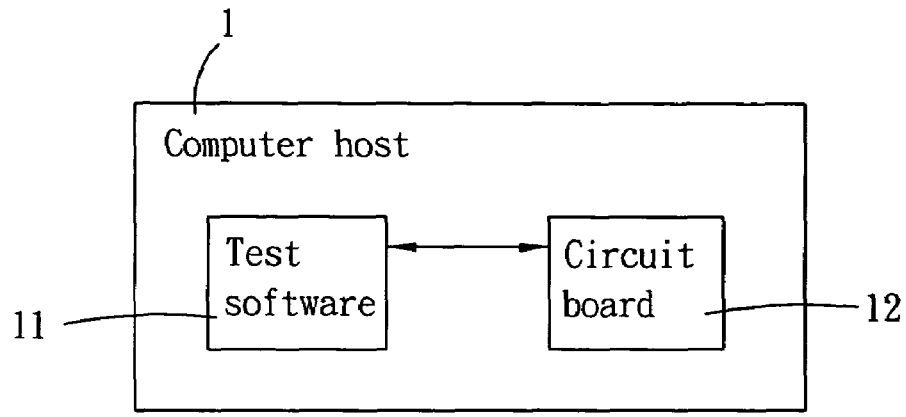
FIG. 1 is a block diagram of the conventional test system.
Figure 2:
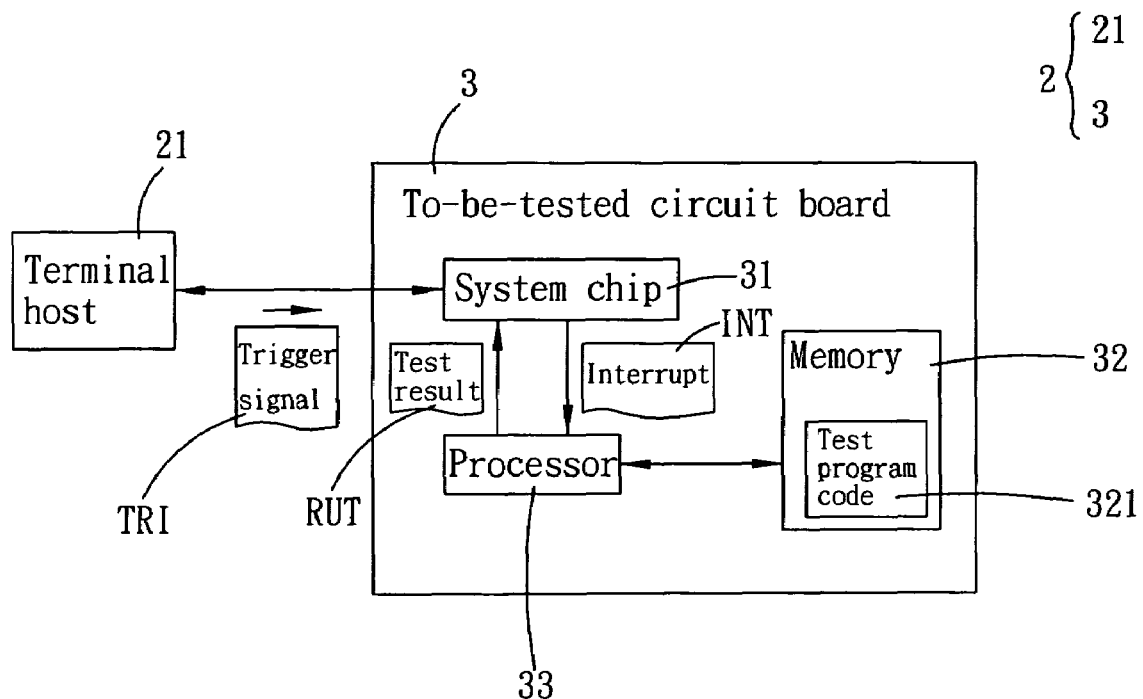
FIG. 2 is a block diagram of a test system according to a preferred embodiment of the invention.

With reference to FIG. 2, a test system 2 according to a preferred embodiment of the invention includes a terminal host 21 and a circuit board 3. In the embodiment, the circuit board 3 includes a system chip 31, a memory 32 and a processor 33.

The terminal host 21 generates a trigger signal TRI. The system chip 31 receives the trigger signal TRI from the terminal host 21 and generates an interrupt INT. The memory 32 stores a test program code 321 corresponding to the interrupt INT. The processor 33 receives the interrupt INT and executes the test program code 321 corresponding to the interrupt INT stored in the memory 32 to generate a test result RUT. The system chip 31 then transmits the test result RUT from the 33 to the terminal host 31.

In the current embodiment, the interrupt INT is a system management interrupt (SMI). The circuit board 3 is a mainboard, and the terminal host 21 is a computer host. The memory 32 can be a BIOS ROM.

Figure 3:
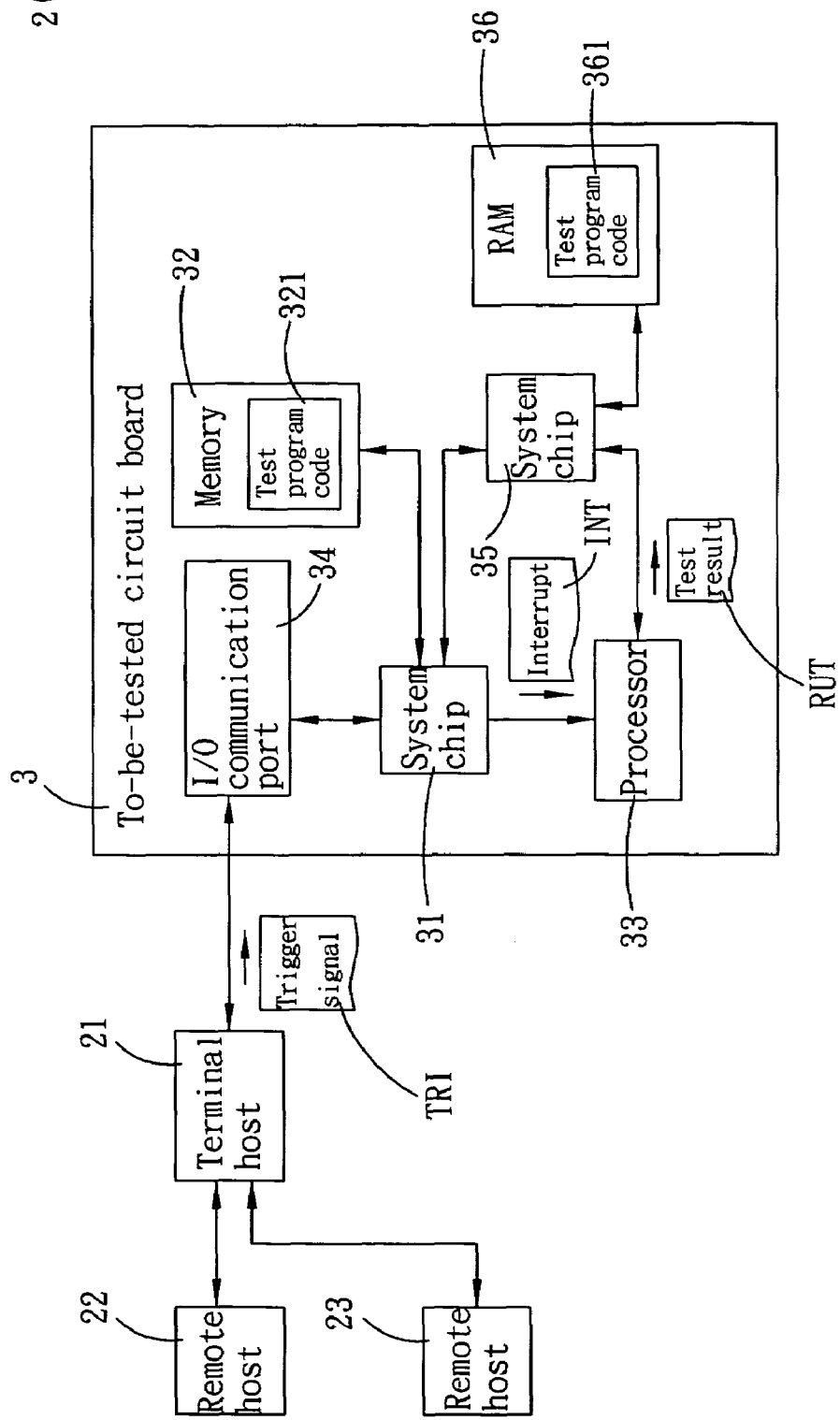
FIG. 3 is a block diagram showing a specific aspect of the test system according to the preferred embodiment of the invention.

Referring to FIG. 3, the circuit board 3 further includes an I/O communication port 34, a system chip 35 and a RAM 36. The test system 2 further includes a remote host 22 and a remote host 23.

After the system is powered on, the processor 33 loads the test program code 321 stored in the memory 32 to the RAM 36 as the program code 361 through the system chip 35 and the system chip 31. The I/O communication port 34 is to receive the trigger signal TRI from the terminal host 21 and to transmit the trigger signal TRI to the system chip 31. The system chip 31 generates the interrupt INT for the processor 33. Then, the processor 33 executes the program code 361 to generate the test result RUT, which is then transmitted from the processor 33 to the system chip 31 through the system chip 35. The I/O communication port 34 may receive the test result RUT from the system chip 31 and transmit it to the terminal host 21. In the embodiment, the I/O communication port 34 is a serial communication port.

In this embodiment, the circuit board 3 may stay at a power-off state, and is waked up by the trigger signal from the terminal host 21. After the processor 33 wakes up the circuit board 3 and before the OS is loaded, the interrupt INT generated by the system chip 31 is the most prior system management interrupt SMI. Thus, the processor 33 will process this system management interrupt SMI in priority and will not interrupted by any other interrupt or operation. In such a case, the test program code 321 corresponding to the interrupt INT is inevitably executed by the processor 33.

The remote host 22 or 23 generates a test request, and the terminal host 21 receives the test request and generates the trigger signal TRI according to the test request. When the test result RUT is generated, the remote host 22 and the remote host 23 will obtain the test result RUT through the terminal host 21. In the embodiment, the remote hosts 22 and 23 can be mobile communication devices, and the terminal host 21 and the remote hosts 22 and 23 may connect with each other via a network such as the LAN or the Internet. Accordingly, the system developer can not only test the circuit board on-site with the terminal host 21, but can also remotely test the circuit board with the remote host 22 or 23. In other words, the system developer is unnecessary to stay around the circuit board, and plurality system developers at different locations can coordinately test the same circuit board.

Figure 4:
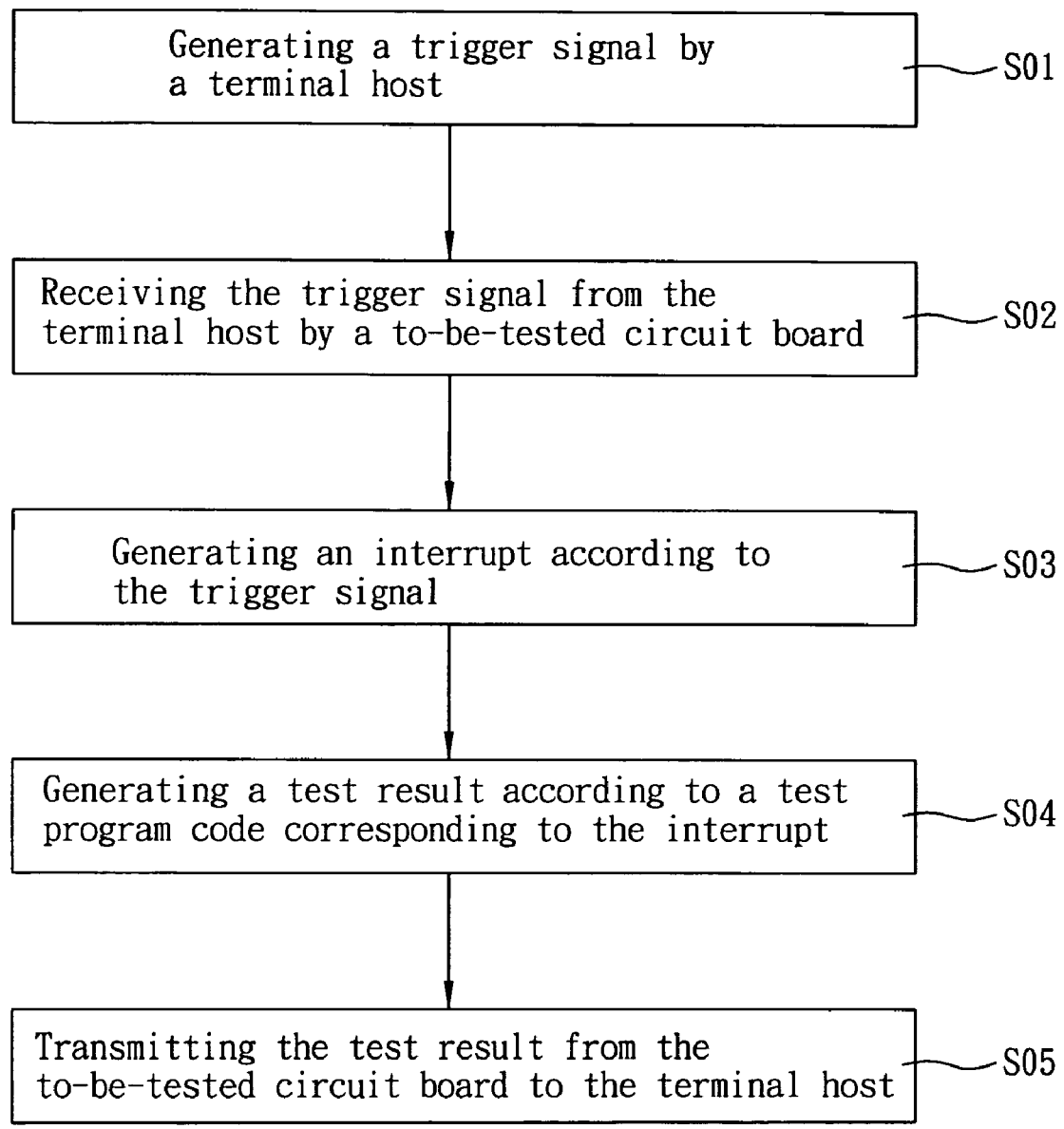
FIG. 4 is a flow chart showing a test method according to a preferred embodiment of the invention.

With reference to FIG. 4, a test method according to a preferred embodiment of the invention includes the following steps S01 to S05.

In step S01, a trigger signal is generated by a terminal host.

In step S02, a to-be-tested circuit board receives the trigger signal from the terminal host.

In step S03, an interrupt is generated according to the trigger signal.

In step S04, a test program code corresponding to the interrupt is executed for generating a test result.

In step S05, the to-be-tested circuit board transmits the test result to the terminal host.

The test method of this embodiment is applied to the above-mentioned test system, which has been discussed in the embodiment in view of FIGS. 2 and 3, so the detailed descriptions about the test method will be omitted for concise purpose.

In summary, the system chip of the to-be-tested circuit board receives the trigger signal from the terminal host and generates the interrupt for the processor. Thus, before the OS is loaded, the processor can execute the test program code corresponding to the interrupt stored in the memory to generate a test result. Accordingly, the system developer can obtain the required test result of the circuit board, and can thus rapidly debug the errors of the circuit board or the related devices. As a result, the developing efficient of the circuit board is enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A test system, comprising:
   a terminal host generating a trigger signal; and
   a to-be-tested circuit board comprising a system chip, a memory and a processor, wherein the system chip receives the trigger signal from the terminal host and generates an interrupt, the memory stores a test program code corresponding to the interrupt, the processor receives the interrupt and executes the test program code corresponding to the interrupt stored in the memory to generate a test result, and then the system chip transmits the test result to the terminal host,
   wherein the interrupt is a system management interrupt (SMI).

2. The test system of claim 1, wherein the to-be-tested circuit board further comprises:
   an I/O communication port receiving the trigger signal from the terminal host, transmitting the trigger signal to the system chip, receiving the test result, and transmitting the test result to the terminal host.

3. The test system of claim 2, wherein the I/O communication port is a serial communication port.

4. The test system of claim 1, further comprising:
   a remote host retrieving the test result through the terminal host.

5. The test system of claim 1, further comprising:
   a remote host generating a test request, wherein the terminal host receives the test request and generates the trigger signal according to the test request.

6. The test system of claim 1, further comprising:
   a remote host connecting to the terminal host via a network.

7. The test system of claim 1, wherein the to-be-tested circuit board is a mainboard.

8. The test system of claim 5, wherein the remote host is a mobile communication device.

9. A test method, comprising:
   generating a trigger signal by a terminal host;
   receiving the trigger signal from the terminal host by a to-be-tested circuit board;
   generating an interrupt according to the trigger signal, wherein the interrupt is a system management interrupt (SMI);
   generating a test result according to a test program code corresponding to the interrupt; and
   transmitting the test result from the to-be-tested circuit board to the terminal host.

10. The test method of claim 9, wherein the step of receiving the trigger signal from the terminal host by the to-be-tested circuit board comprises:
    receiving the trigger signal from the terminal host by an I/O communication port of the to-be-tested circuit board.

11. The test method of claim 10, wherein the I/O communication port is a serial communication port.

12. The test method of claim 9, wherein the step of transmitting the test result from the to-be-tested circuit board to the terminal host comprises:
    transmitting the test result from the to-be-tested circuit board to the terminal host through an I/O communication port of the to-be-tested circuit board.

13. The test method of claim 12, wherein the I/O communication port is a serial communication port.

14. The test method of claim 9, further comprising:
    retrieving the test result from the terminal host by a remote host.

15. The test method of claim 14, wherein the remote host is a mobile communication device.

16. The test method of claim 9, further comprising:
    generating a test request by a remote host, wherein the terminal host receives the test request and generates the trigger signal according to the test request.

17. The test method of claim 9, further comprising:
    establishing a connection between a remote host and the terminal host via a network.

18. The test method of claim 9, wherein the to-be-tested circuit board is a mainboard.

* * * * *